United States Patent [19]

Watanabe et al.

[11] Patent Number: 4,580,263

[45] Date of Patent: Apr. 1, 1986

[54] SIGNAL QUALITY MONITORING DEVICE

[75] Inventors: Tatsuo Watanabe; Toshio Mizuno, both of Tokyo; Makoto Miyake; Tadashi Fujino, both of Hyogo, all of Japan

[73] Assignees: Mitsubishi Denki Kabushiki Kaisha; Kokusai Denshin Denwa Co., Ltd., both of Japan

[21] Appl. No.: 544,192

[22] Filed: Oct. 21, 1983

[30] Foreign Application Priority Data

Oct. 21, 1982 [JP] Japan ................................ 57-185259

[51] Int. Cl.$^4$ ........................ G06F 11/00; H03K 13/32
[52] U.S. Cl. ............................................ 371/5; 371/6
[58] Field of Search .................... 371/5, 6; 375/34, 58; 455/63

[56] References Cited

U.S. PATENT DOCUMENTS

| | | | |
|---|---|---|---|
| 4,034,340 | 7/1977 | Sant'Agostino | 371/5 X |
| 4,247,938 | 1/1981 | Kurihara et al. | 371/5 |
| 4,367,550 | 1/1983 | Douverne | 371/5 |
| 4,375,099 | 2/1983 | Waters et al. | 371/6 |

FOREIGN PATENT DOCUMENTS

| | | |
|---|---|---|
| 0048866 | 4/1982 | European Pat. Off. . |
| 1105447 | 3/1968 | United Kingdom . |
| 1581086 | 12/1980 | United Kingdom . |
| 2072997A | 10/1981 | United Kingdom . |

OTHER PUBLICATIONS

Keelty et al., On-Line, Pseudo-Error Monitors for Digital Transmission Systems, IEEE Transactions on Comm., vol. COM-26, No. 8, Aug. 1978, pp. 1275-1282.

Takenaka et al., Bit Error Rate Monitor for Four Phase PSK Systems, 1980 Intl. Conf. on Communications, Seattle, WA., Jun. 8-12 1980, pp. 251-256.

Primary Examiner—Charles E. Atkinson
Attorney, Agent, or Firm—Sughrue, Mion, Zinn, Macpeak, and Seas

[57] ABSTRACT

The error rate of a signal is monitored by sampling an input signal with a first clock and also with second and third clocks phase delayed in equal but opposite directions with respect to the first clock, and then logically combining the first through third sampled outputs in order to obtain an error signal.

6 Claims, 9 Drawing Figures

SIGNAL QUALITY MONITORING DEVICE

BACKGROUND OF THE INVENTION

The present invention relates to a signal quality monitoring device in which the phase of a clock signal for demodulating data in a digital communication system is purposely offset to increase the bit error rate (hereinafter referred to as "BER", when applicable), of an input signal and the apparently increased pseudo-error rate is measured to monitor the quality of the input signal.

Figure 1:
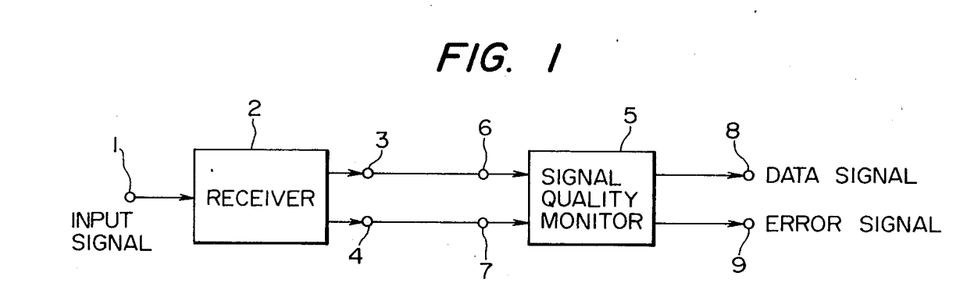
FIG. 1 is a connection diagram showing a signal quality monitoring device and a receiver.

A device of this type is connected to a receiver as shown in FIG. 1. In FIG. 1, reference numeral 1 designates the input terminal of an input signal applied to the receiver 2; 3, an output terminal of the receiver 2 at which is provided a baseband signal, that is, a signal which has not yet been demodulated; 4, an output terminal at which is provided a recovered clock signal produced by the receiver 2; 5, the signal quality monitoring device; 6, an input terminal for the baseband signal; 7, an input terminal for the recovered clock signal; 8, an output terminal for demodulated data; and 9, an output terminal for an error pulse signal provided for a pseudo-error rate.

Figure 2:
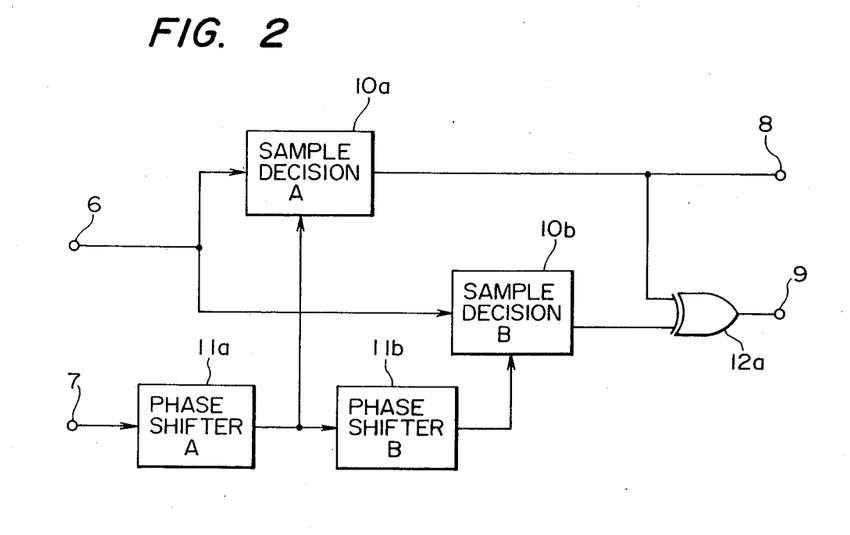
FIG. 2 is a block diagram showing a conventional signal quality monitoring device.

FIG. 2 shows in block diagram form an example of a conventional signal quality monitoring device 5. In FIG. 2, 10a and 10b designate sample-and-decision circuits A and B, respectively, which detect at predetermined sampling intervals whether the input signal is "1" or "0", and 11a and 11b denote a phase shifter A and a phase shifter B, respectively, which selectively set the phases of clock signals applied to the sample-and-decision circuits A and B for effecting the sampling operations. More specifically, the phase shifter A (11a) is a variable phase shifter which can set a desired phase shift. Further in FIG. 2, 12a designates an EXCLUSIVE OR gate which receives as inputs the outputs of the samplers A and B.

Figure 3:
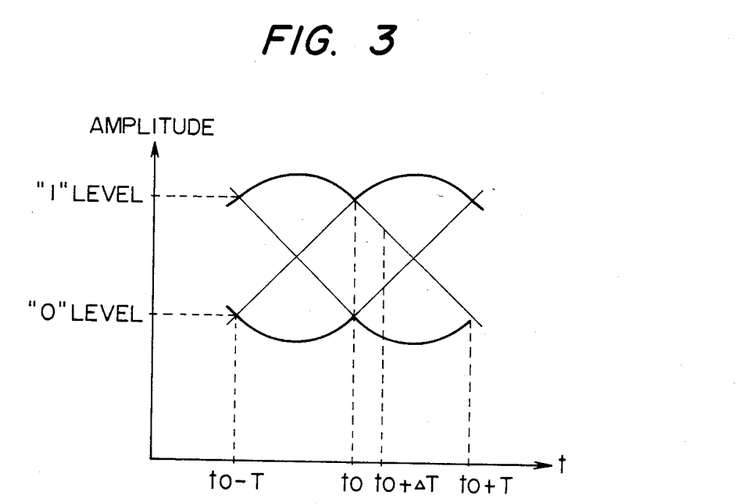
FIG. 3 is an explanatory diagram for a description of the principle of offset sampling.

In operation, the baseband signal is applied through the input terminal 6 to the sample-and-decision circuit A (10a) and the sample-and-decision circuit B (10b). As the signal is not yet demodulated, it can be represented by an "eye" pattern as shown in FIG. 3. In the "eye" pattern of FIG. 3, the transmission waveform is a Nyquist waveform. At the time instant $t_0$, a "1" or "0" amplitude is transmitted without intersymbol interference from adjacent data bits.

In the receiver 2, at the same time instant to the baseband signal is sampled to demodulate the data. The sample-and-decision circuit A (10a) carries out completely the same operation as the receiver 2. The phase shifter A (11a) operates to adjust the phase of the clock signal applied to the input terminal, thereby to cause the sampling time of the sample-and-decision circuit A (10a) to coincide with the Nyquist point of the baseband signal. Accordingly, demodulated data, which is the same as the demodulated data of the receiver, is provided at the output terminal 8.

The phase shifter B (11b) slightly offsets the phase of the clock signal applied to the sample-and-decision circuit B (10b). Accordingly, the phase shifter B causes the sampler B to act as an offset sampler which performs sampling (demodulation) of the data at a time instant which is somewhat shifted from the Nyquist point. The amount of offset corresponds, for instance, to $\Delta T$ in FIG. 3. The value $\Delta T$ is, in general, set much smaller than one-half ($\frac{1}{2}$) of the period T of data. Therefore, the output data of the sample-and-decision circuit B (10b) will always be valid. However, since the sampling time of the sample-and-decision circuit B (10b) is offset by $\Delta T$ from the Nyquist point, the BER of the output data of the sample-and-decision circuit B (10b) is larger than that of the output data of the sample-and-decision circuit A (10a). In this sense, the BER of the sample-and-decision circuit B is called a pseudo-error rate. The EXCLUSIVE OR gate 12a is provided to output an error pulse signal which is indicative of the difference between the BERs of the sample-and-decision circuits A and B. The output of the gate is at a low level when the data is demodulated correctly by both of the sample-and-decision circuits 10a and 10b, and at a high level when one of the samples produces an erroneous output, for instance, when the data is demodulated correctly by the sample-and-decision circuit A (10a) but is demodulated erroneously by the sample-and-decision circuit B (10b).

The error pulse signal for the pseudo-error rate is provided at the output terminal 9 as described above. The BER of the received data can be estimated by measuring the frequency of the error pulse signal. That is, even if the content of data is unknown, the quality of the received signal can be monitored by measuring the BER in the manner described.

Figure 4:
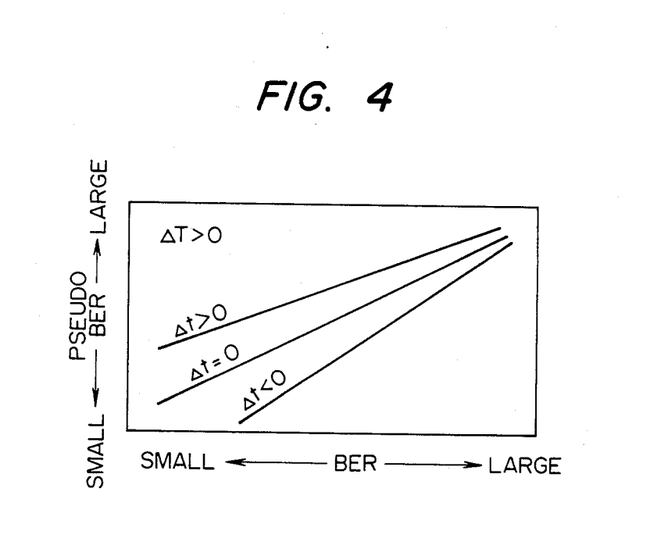
FIG. 4 is a graphical representation showing pseudo-error rate (PER) vs. BER as a function of clock signal phase error.

If the clock signal supplied from the receiver 2 has a phase error $\Delta t$, the sampling time of the sample-and-decision circuit 10a is $t_0 + \Delta t$, and the BER is increased beyond what it would be in the case of no phase error in the clock signal. In such a case, the sampling time of the sample-and-decision circuit 10b is $t_0 + \Delta T + \Delta t$. Thus, if $\Delta T > 0$ and $\Delta t > 0$, the pseudo-error rate is increased, and in the case of $\Delta T > 0$ and $\Delta t < 0$, the pseudo-error rate is decreased. In general, the variation of the pseudo-error rate with $\Delta t$ is much larger than that of the BER with $\Delta t$, as shown by the graph of FIG. 4. As is apparent from FIG. 4, the relation between the BER and the pseudo-error rate varies as a function of the phase error $\Delta t$ of the clock signal, and accordingly, if the BER of the received signal is estimated by measuring the pseudo-error rate, the BER thus estimated includes an error.

Possible causes for the phase error $\Delta t$ in the clock signal include:

(1) waveform distortion in the transmission path,
(2) error in the phase shifter A, and
(3) variation of environmental conditions such as the ambient temperature around the receiver and signal quality monitoring device.

In the case of (1) waveform distortion in the transmission path, the relation between the Nyquist point of the received signal and the phase of the clock signal is changed by the waveform distortion of the received signal. For instance, in satellite communications, waveform distortion arises due to nonlinearity in the satellite transponder. If, in an up link to the satellite from a ground station the signal level is changed, for instance, by the presence of rainfall, the operating point of the satellite transponder is changed, and accordingly the characteristic of the signal distortion of the down link is changed. Hence, various phase errors occur in the receiver 2 which depend on the conditions of the up link, which are difficult or impossible to control.

On the other hand, the above-described causes (2) and (3) relate to the device itself. Therefore, the influence due to these causes can be suppressed by carefully performing the phase settings or making provisions for temperature compensation.

An object of the invention is to eliminate the above-described difficulties accompanying a conventional signal quality monitoring device.

SUMMARY OF THE INVENTION

The above and other objects of the invention are met by providing a signal quality monitoring device in which the input signal is subjected to offset sampling with delayed and advanced clock signals opposite to each other in the direction of phase shift, and the resultant outputs are combined, whereby the accuracy of the BER measurement thus produced is highly independent of the presence or absence of phase errors in the clock signals.

BRIEF DESCRIPTION OF THE DRAWINGS

The invention will be more clearly understood from the following description in conjunction with the accompanying drawings, wherein.

DESCRIPTION OF THE PREFERRED EMBODIMENTS

A preferred embodiment of the invention will now be described with reference to FIG. 5. The signal quality monitoring device of FIG. 5 differs from the conventional device of FIG. 2 in the provision of an offset sample-and-decision circuit 10c, a phase shifter 11c for phase shifting the clock signal applied to the sample-and-decision circuit 10c, an EXCLUSIVE OR gate 12b receiving as inputs the sampling outputs of the sample-and-decision circuit 10a and the sample-and-decision circuit 10c, an OR gate 13 receiving as inputs the outputs of the two EXCLUSIVE OR gates 12a and 12b.

The operation of the circuit of FIG. 5 will now be described. It is assumed that the amount of offset of the sample-and-decision circuit B (10b) is $\Delta T_1$ ($>0$), and the amount of offset of the sample-and-decision circuit C is $-\Delta T_2$ ($<0$). That is, the offset in the sample-and-decision circuit 10b is a delay and the offset in the sample-and-decision circuit C (10c) is an advance. Error pulse signals corresponding to pseudo-error rates due to these two different offset samplings are generated by the EXCLUSIVE OR gates 12a and 12b. The two error pulse signals are applied to the OR gate 13, which provides an output at the output terminal 9.

In the signal quality monitoring device of the invention constructed as described above, even if a phase shift error $\Delta t$ occurs in the clock signal because of the waveform distortion or the like in the transmission path, the offset of the phase shift error is effectively suppressed. For instance, when a phase shift error $\Delta t$ ($>0$) occurs, as is apparent from the graph of FIG. 4, the pseudo-error rate of the delayed offset sampling is increased and the frequency of the error pulse signal from the sample-and-decision circuit 10b is increased. On the other hand, the pseudo-error rate of the advanced offset sampling with an offset $-\Delta T_2$ ($<0$) is decreased and the frequency of the error pulse signal from the sample-and-decision circuit 10c is correspondingly decreased. As a result, the frequency of the error pulse signal produced by the OR gate 13 is substantially equal to that when no phase shift is involved ($\Delta t = 0$).

In the signal quality monitoring device of the invention, two types of sampling are carried out. As a result, the finally obtained frequency of the error pulse signal is about twice that in the conventional device. Accordingly, the accuracy of the BER estimated from the pseudo-error rate which is measured within a predetermined period of time is high compared with that of the conventional device.

With such a conventional device of FIG. 2, in order to coincide the phase of the clock signal with the Nyquist point of the received signal, it is necessary in initial setup to adjust the phase shifter 11a to minimize the BER of the demodulated data at the output terminal 8. On the other hand, in the device of the invention, if the two offset data signals are equal in absolute value ($\Delta T$ and $-\Delta T$) and the received waveform is symmetrical near the Nyquist point, then the sampling time of the sampler 10a can be made to coincide with the Nyquist point by adjusting the phase shifter A (11a) so that the frequency of the error pulse corresponding to the pseudo-error rate is a minimum. Thus, in the device of the invention, it is not always necessary to measure the BER at the output point 8. Therefore, in the device of the invention, initial setup can more readily be accomplished than in the conventional device.

In the above-described embodiment, error pulse signals corresponding to two types of pseudo-error rates, for advanced offset sampling and delayed offset sampling are applied to the OR gate. However, the error pulse signals may be applied to two output terminals, or the generated error pulse signals may be subjected to NRZ/RZ conversion.

As is apparent from the above description, in accordance with the invention, the input signal is subjected to offset sampling with delayed and advanced clock signals, and the results are combined to provide the error pulse signal which gives the pseudo-error rate. Accordingly, the estimated BER obtained is highly accurate and is independent of the phase error of the clock signal.

Figure 6:
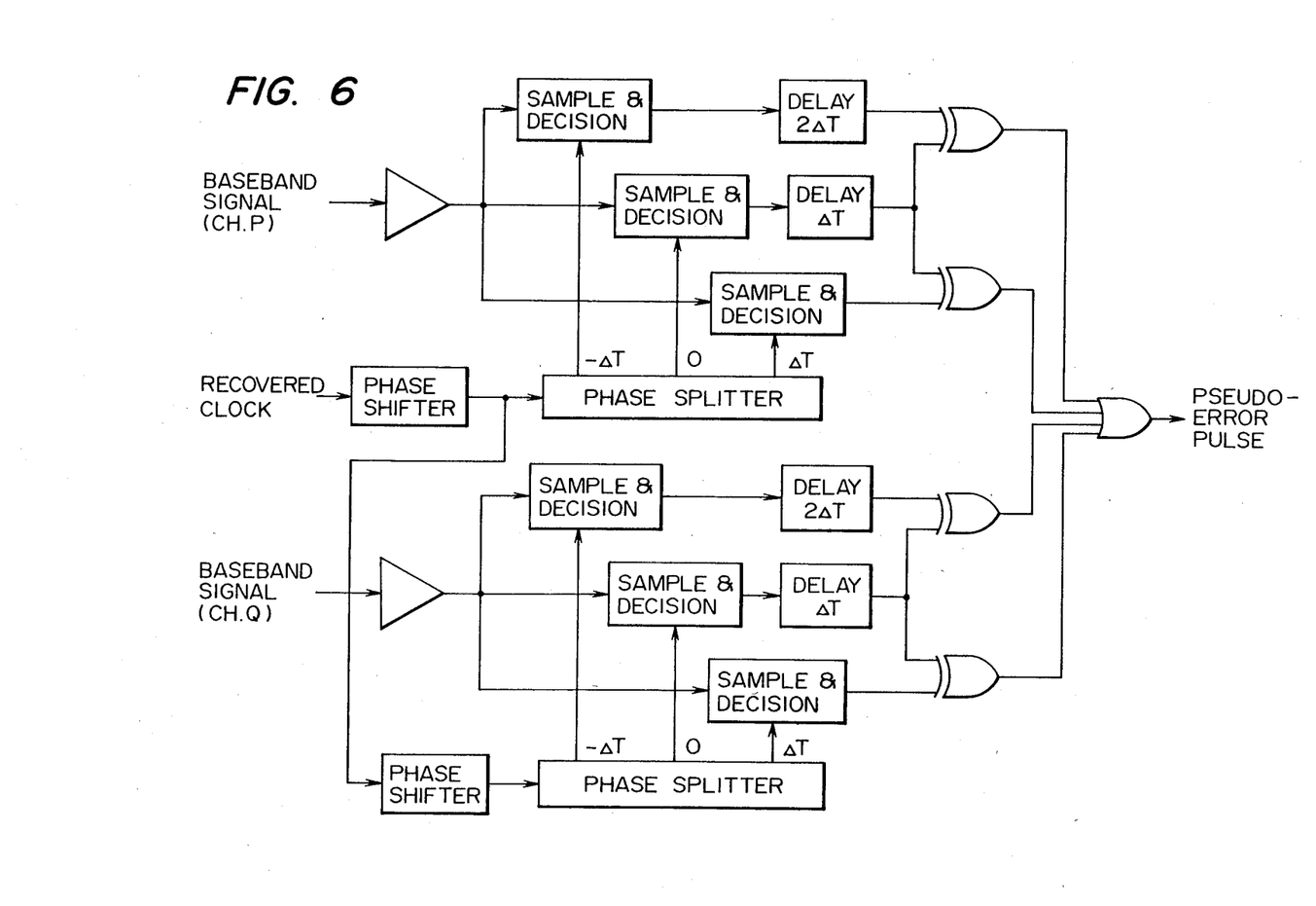
FIG. 6 is a block diagram of a further example of the pseudo-error detector of the invention intended for use in QPSK communications systems.

A further example of a pseudo-error detector of the invention is shown in FIG. 6. In the INTELSAT TDMA communication system, two baseband signals P and Q are transmitted, after being subjected to QPSK modulation. The embodiment of FIG. 6 is directed to this case. In this device, offset sampling is carried out four times for each data symbol. The sampling results are compared with the sampling result obtained at the Nyquist point in the EXCLUSIVE OR gate and are finally combined at the OR gate, which outputs a pseudo-error pulse.

Figure 5:
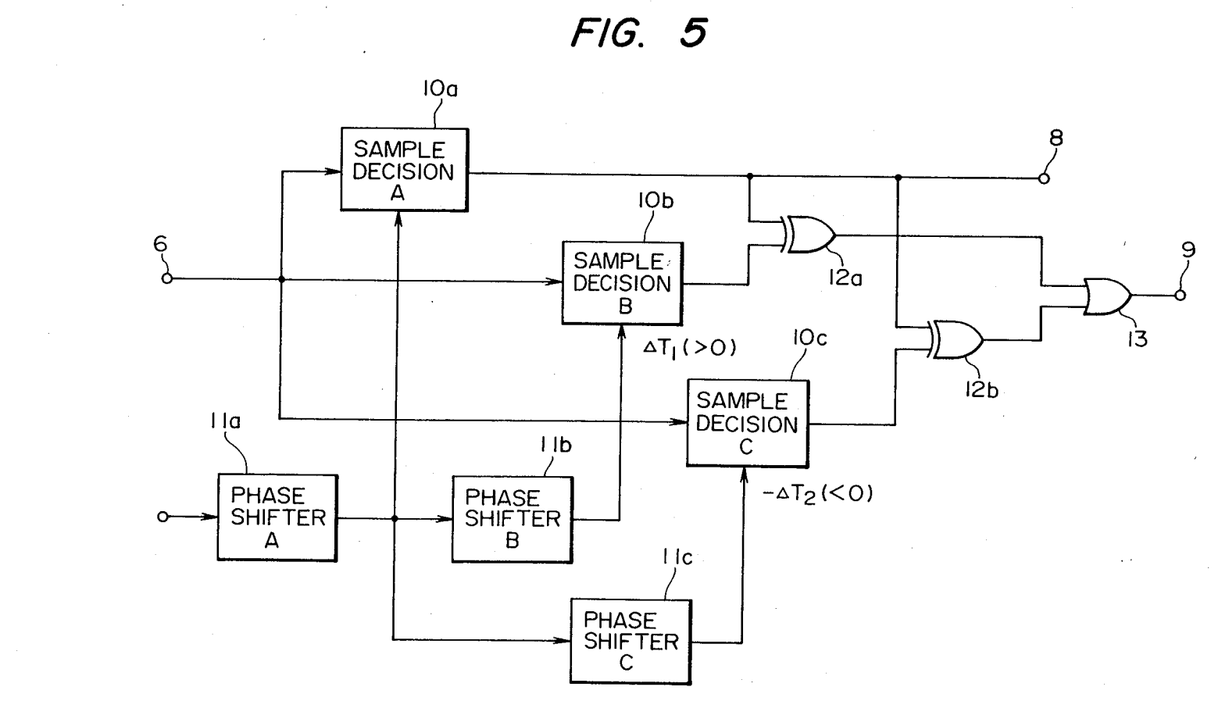
FIG. 5 is a block diagram showing a signal quality monitoring device according to a preferred embodiment of the invention.

In the embodiment of FIG. 6, delay elements having delay times of ΔT and 2ΔT are inserted after the sample-and-decision circuits corresponding to the circuits 10b and 10a, respectively, in FIG. 5. The purpose of the delay elements is to eliminate skewing caused by the difference in sampling times among the three sample-and-decision circuits. However, if ΔT is sufficiently small, the amount of error due to skewing will be small and can be neglected, and hence the delay elements can be omitted as in the case of FIG. 5.

The speed of transmission in the INTELSAT communication system is 120,832 M bits/s. Based on this value, the offset ΔT is selected to be 2.1 nsec in correspondence to the phase difference /8 of the clock signal.

Characteristic Test

Figure 7:
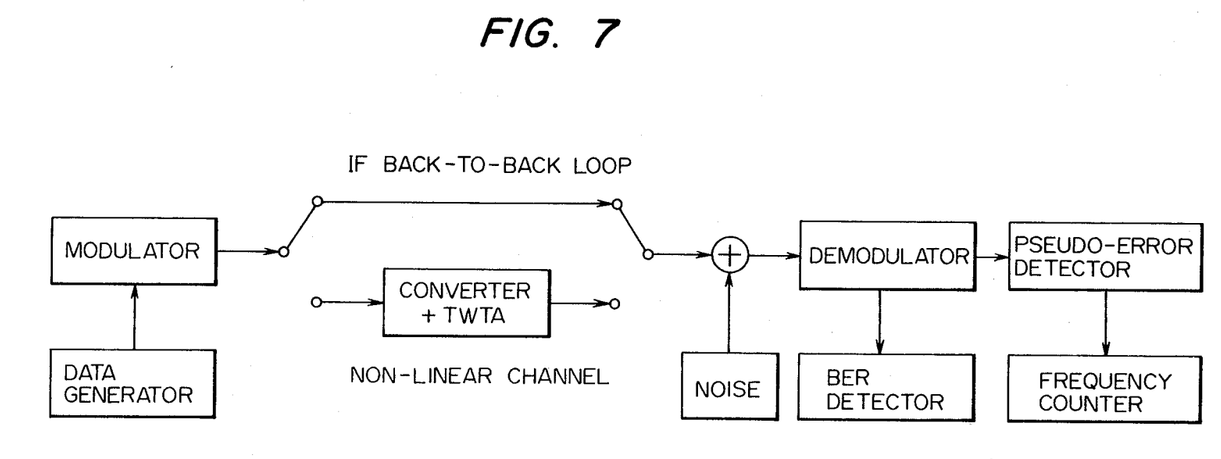
FIG. 7 is a brief diagram of essential components of a characteristic testing system in which the pseudo-error detector of FIG. 6 can be employed.

The arrangement of a characteristic testing system is as shown in FIG. 7. The system in FIG. 7 employs a 1.7 GHz converter and TWTA for simulation of the non-linear channel of a satellite link. The operating point of TWTA in the testing system is so selected to be in agreement with the characteristic of the TWTA of INTELSAT V.

In the non-linear channel, the waveform of the received signal is distorted. Therefore, in order to obtain the best BER with a demodulator, the phase of the recovered carrier and that of the recovered clock signal should be readjusted so as to compensate the signal distortion in the non-linear channel. However, the characteristic test is carried out both when the demodulator has been readjusted and when it has not been readjusted, so that while the effect of the nonlinearity of the transmission path is detected, the effect of the phase error in the recovered carrier and the recovered clock signal is also detected.

Figure 8:
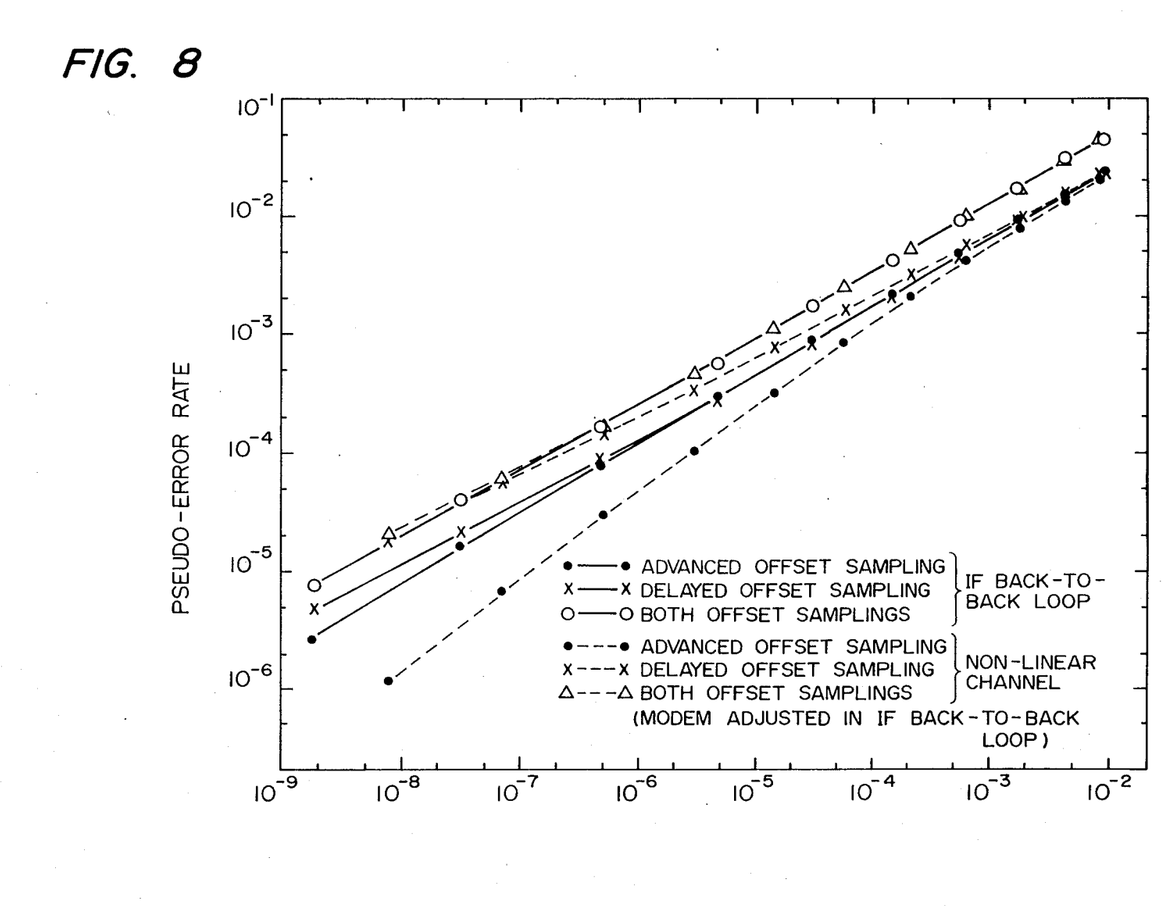
FIG. 8 is a graphical representation showing pseudo-error rate (PER) vs. BER as a function of sampling clock phase offset in both the IF back-to-back loop and non-linear channel portions of the characteristic testing arrangement illustrated in FIG. 7.

First, the effectiveness of the system in which advanced offset sampling and delayed offset sampling are combined, will be described. FIG. 8 shows pseudo-error rate (PER) vs. bit error rate (BER) characteristics according to various offset sampling methods in the IF back-to-back loop and the non-linear channel with the demodulator adjusted by the IF back-to-back loop being used. As is apparent from FIG. 8 when the actual BER is $1 \times 10^{-6}$ in the non-linear channel, the BER estimated by the advanced offset sampling method is $2.2 \times 10^{-7}$ If the delayed offset sampling method is used, then the estimated BER is $2.2 \times 10^{-6}$. When both offset sampling methods are used in combination, the PER vs. BER characteristic in the case of the IF back-to-back loop is substantially equal to that in the case of the non-linear channel. This means that employment of the offset sampling method of the invention permits estimation of the BER with high accuracy in the non-linear channel.

Figure 9:
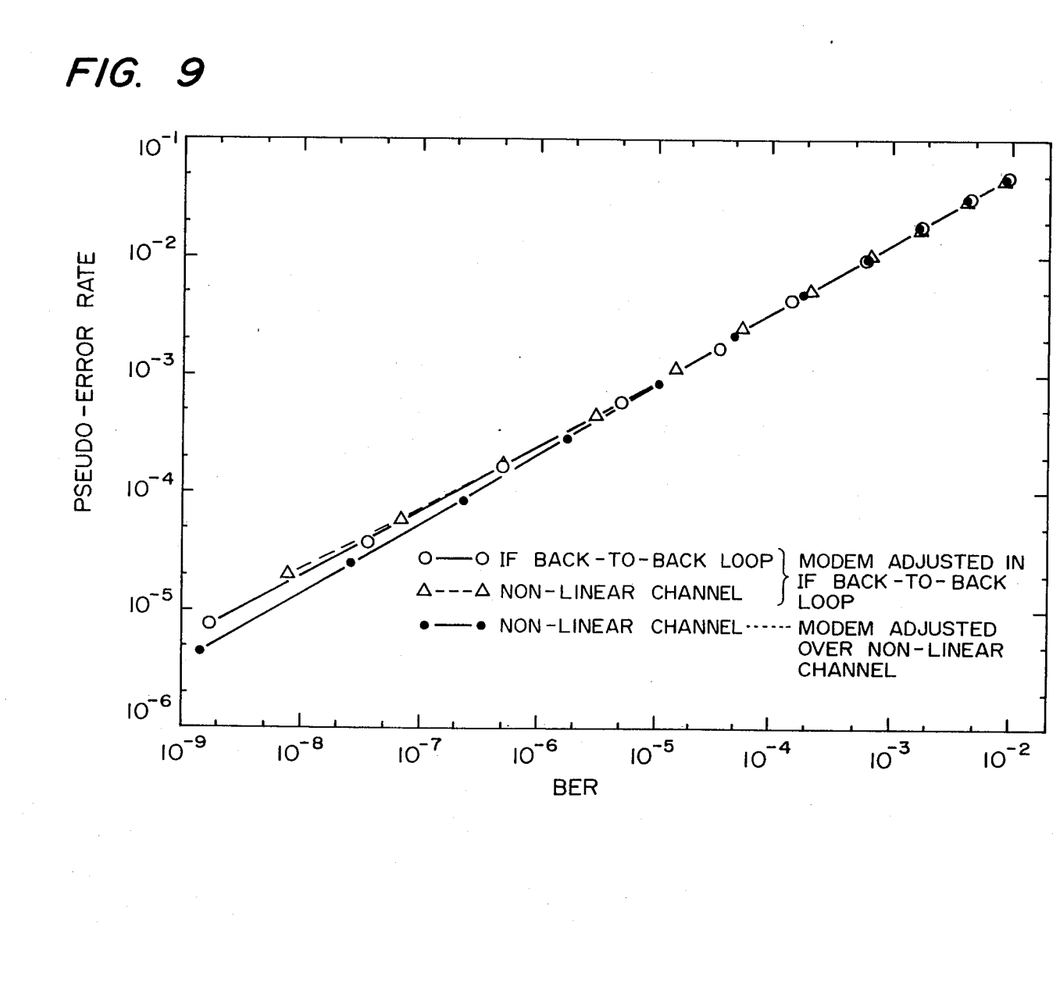
FIG. 9 is a graphical illustration showing PER vs. BER in the IF back-to-back loop and non-linear channel portions of the testing configuration of FIG. 7 for adjustment of the modem for either the IF back-to-back loop or non-linear channel portions.

FIG. 9 shows PER vs. BER characteristics provided both when the demodulator is readjusted in the non-linear channel and when it is not readjusted therein. As is apparent from FIG. 9, in both cases, when the actual BER is greater than $1 \times 10^{-6}$, the relative error in the estimated BER is 30% or less, and when the actual BER is greater than $1 \times 10^{-8}$, the relative error in the estimated BER is 51% or less. This result means that the pseudo-error detector of the invention can estimate the BER accurately in the non-linear channel, and is substantially immune to the phase error in the recovered carrier and that of the recovered clock signal.

The above description concerns the characteristic test to find out the effects of the non-linearity of the transmission path. In addition, the following characteristic tests have been carried out:

(1) Fluctuation of PER in the case where a measurement gate length per TDMA frame is about 1000 symbols;

(2) The effect of the phase ambiguity of the recovered carrier;

(3) The effect of the level variation of the received signal;

(4) The effect of the operating point variaion of TWTA.

The results of these characteristic tests have been satisfactory, and it has been confirmed that the above-described pseudo-error detection is effective in accurately estimating the BER in the TDMA communication system. The invention has therefore been proven effective with actual hardware.

What is claimed is:

1. An apparatus for monitoring the signal quality of a composite signal having at least first and second channel signals, said apparatus including first and second signal processing portions each receiving one of said first and second channel signals as its input signal and each comprising first sampling means for sampling an input signal with a first clock signal, second sampling means for sampling said input signal with a second clock signal, third sampling means for sampling said input signal with a third clock signal and clock means for generating said first, second and third clock signals having different phases, said apparatus further comprising combining means for combining the outputs from said first through third sampling means from both processing portions in order to obtain an error signal, said combining means comprising a first EXCLUSIVE-OR gate for combining said outputs of said first and second sampling means, a second EXCLUSIVE-OR gate for receiving and combining the outputs of said first and third sampling means, and an OR gate for receiving and combining the outputs of said first and second EXCLUSIVE-OR gates.

2. A signal quality monitoring device comprising:
first sampling means for sampling an input signal in accordance with a first clock signal;
second sampling means for sampling said input signal in accordance with a second clock signal;
third sampling means for sampling said input signal in accordance with a third clock signal;
clock means for generating said first, second, and third clock signals, said first and second clock signals having different phases, said third clock signal having a phase offset with respect to both of said first and second clock signals, phases of said second and third clock signals being offset in opposite directions with respect to said first clock signal; and
combining means for combining all of the outputs of said first, second and third sampling means to obtain an error signal, said combining means comprising a first EXCLUSIVE-OR gate for combining said outputs of said first and second sampling means, a second EXCLUSIVE-OR gate for receiving and combining the outputs of said first and third sampling means, and an OR gate for receiving and combining the outputs of said first and second EXCLUSIVE-OR gates.

3. A signal quality monitoring device as claimed in claim 2, wherein said clock means generates said first and second clock signals with a phase difference equal to that between said first and third clock signals.

4. A signal quality monitoring device as claimed in claim 3, further comprising delay means for delaying outputs from at least two of said first, second, and third sampling means, whereby outputs of all of said first, second, and third sampling means are phase-aligned.

5. A signal quality monitoring device as claimed in claim 4, wherein said delay means comprises first means for delaying an output of said first sampling means by a first predetermined amount, and second means for delaying an output of said second sampling means by a second predetermined amount.

6. A signal quality monitoring device as claimed in claim 5, wherein said first predetermined amount substantially corresponds to an overall phase shift between said first and third clock signals, and said second predetermined amount substantially corresponds to an overall phase shift between said second and third clock signals.

* * * * *